Patented Apr. 15, 1924.

1,490,794

UNITED STATES PATENT OFFICE.

HAROLD MONTAGUE ALEXANDER, OF BEXLEY HEATH, ENGLAND.

METHOD OF AND MEANS FOR SEPARATING LIQUIDS OF DIFFERENT SPECIFIC GRAVITY.

Application filed May 4, 1923. Serial No. 636,610.

*To all whom it may concern:*

Be it known that I, HAROLD MONTAGUE ALEXANDER, consulting engineer, a subject of the King of Great Britain, residing at Alconbury, Broomfield Road, Bexley Heath, in the county of Kent, England, have invented a certain new and useful Improved Method of and Means for Separating Liquids of Different Specific Gravity, of which the following is a specification.

This invention relates to improvements in the method of and means for decanting or separating and recovering liquids of different specific gravity from a mixture of such liquids which method consists in introducing the mixture into a mass of the heavier liquid contained in a chamber open to the atmosphere and directing or deflecting said incoming mixture in an upward direction and discharging the lighter liquid from the top of said chamber and the heavier liquid from the lower part thereof. This invention is particularly applicable to the separation and recovery of oil from a mixture of oil and water; and will for convenience be more particularly described herein as applied to such separation of oil and water although understood to be applicable as aforesaid to the separation from a mixture thereof of any liquids of different specific gravity adapted to be separated thereby.

The method of decanting or separating liquids of different specific gravity from a mixture of such liquids (which mixture I will hereinafter generally refer to as a mixture of oil and water) consists in delivering the mixture of oil and water to be separated into a separating chamber containing water (i. e., the heavier of the two liquids) and directing or deflecting said incoming stream of mixture in an upward direction in the water in said chamber advantageously through a central zone thereon and in such wise that a relatively tranquil zone of the water is left remote from the point at which the said incoming mixture is introduced into the separating chamber, e. g., said tranquil zone may advantageously be located below the level of the said point of introduction.

The oil (i. e., the lighter liquid) is discharged from the said chamber (which is open to atmospheric pressure) at the highest part thereof and the water at a convenient place advantageously the lowest part thereof.

One feature of the present invention is that the mixture is so introduced into the said chamber and so directed or deflected therein that the place where the water is discharged from said chamber is a comparatively tranquil zone and the water is withdrawn in such a way as to cause the least possible disturbance of such tranquillity at any point or points in said tranquil zone; and this I attain by arranging that the said place of discharge of the water is remote from the point at which the mixture is introduced and advantageously below the said point and by withdrawing the water evenly all round or at a number of points symmetrically arranged in the tranquil zone; moreover I may arrange that the cross-sectional area of the said chamber increases as the place of withdrawal of the water is approached e. g. I may make the said chamber cone-shaped and withdraw the water from points at or near—and evenly all round—the circumference of the base thereof.

The oil is discharged from the said main chamber at a point in the top thereof (e. g., when the said chamber is cone-shaped, at the apex thereof) and above (advantageously vertically above) the point at which the mixture is introduced and so remote therefrom that practically no water will be carried away with the oil; advantageously the oil is discharged through a tubular casing arranged vertically and connected (i. e., in open communication) at its lower end with the top of the said chamber, the cross sectional area of the said tubular casing being such that the flow of oil therein (as the latter is discharged) is not so rapid as to prevent separation of oil and water therein.

The mixture is introduced into the said chamber, which is open to atmospheric pressure, through a pipe which projects into the interior thereof and so arranged that the inflowing mixture is directed by the mouth of the pipe, or deflected by an appropriately shaped and appropriately positioned baffle-plate or deflecting plate, in an upward direction towards the place of discharge of the oil. The point at which the incoming stream of mixture is introduced or deflected in the said chamber should be so selected that, whilst it is as remote as possible from the said place of discharge of water, it should not be so near the said point of discharge of oil that water is caused to travel and be discharged with the oil.

My experiments have led me to believe that the optimum point for the introduction of mixture into the said chamber is at or about the centre of mass of the liquid therein.

The pipe through which the mixture is introduced into the said chamber may pass into the said chamber at any convenient point in the walls or base thereof for example I may introduce the said pipe into the said chamber vertically downwards so that it passes centrally through the aforesaid tubular casing through which the oil is discharged; and adjacent to the mouth of the said pipe and close below it I arrange within the said chamber a dished or saucer-shaped baffle plate or deflecting plate so that the mixture coming down the said pipe is introduced into the water in the said chamber and therein deflected upwardly towards the said tubular casing wherethrough the oil is discharged as above explained.

The edges of the baffle plate must not come so close to the walls of the chamber that the stream of water passing down to the place of discharge of water from the chamber is so rapid as to carry with it considerable quantities of oil.

During the working of the process the aforesaid tubular casing through which the oil is discharged is kept more or less completely filled with oil and the oil is discharged from the upper end of that casing as and when more oil accumulates at the lower end thereof; for this purpose I provide an oil weir at the upper end of the said casing and arrange (as hereinafter described) that water should be discharged from the chamber at the same rate as it is introduced therein by the stream of inflowing mixture. The level of water is thus constantly maintained in the said chamber so that when oil, separated from the incoming mixture, is directed or deflected to the top of said chamber and finds its way into the aforesaid tubular casing it causes the oil therein to rise and overflow the above-mentioned oil weir.

Water is discharged from the said chamber through a pipe arranged in the aforesaid tranquil zone and leading out of said chamber. A convenient hand-operated means may be provided to regulate the discharge of water and suitable observation means may be provided to enable the maintenance of a constant level of water in the said chamber; but I prefer to make the discharge of water automatic and for this purpose the water discharge pipe is led upwards, outside the said chamber, to the desired level of discharge—or into a tank the discharge level of which latter is—at approximately the same level as the top of the tubular casing through which the oil is discharged; the level of water in the said tank or other conduit, i. e., the level of discharge of the water will be lower than that of the oil in the said tubular casing.

I may arrange a weir in the said tank, the height of which is so arranged with reference to the height of the oil weir in the said tubular casing, that when the said tubular casing is full of oil, and only water is being introduced into the said chamber, water will flow over the water weir at the same rate as that at which it is being introduced into the said chamber; for this purpose I may, if desired, arrange that the two weirs are, or one of them is, adjustable.

Or I may arrange for the automatic discharge by other means, e. g., by means of a float in the said water tank regulating by its height (rise or fall) a water discharge valve as hereinafter described. Further I may arrange, intermediately between the place where the water is discharged from the said chamber and the said water tank, an oil trap for removing the last traces of oil (if any) from the water; such an arrangement is hereinafter described.

My present invention further comprises apparatus and means for effecting such decanting or separation of liquids of different specific gravity all as hereinafter fully described.

Apparatus for decanting or separating a mixture of oil and water (or a mixture of any other liquids of different specific gravity) according to this invention is as follows:—

The main tank in which a substantially complete separation of the mixture of oil and water takes place, comprises a chamber of any suitable shape and advantageously of truncated cone-shape, i. e., progressively increasing downwardly in cross-sectional area and terminating at its truncated upper end in an upright tubular casing (advantageously cylindrical and of relatively small cross-sectional area) forming a chamber or conduit for receiving the oil—and thereby forming a column of the oil—which has been separated in the said cone-shaped chamber, which latter I will term the "main separating chamber," and conducting said oil to the point of delivery at the upper end of said upright tubular casing and the said chamber or conduit formed by the latter I will hereinafter refer to as the "oil column chamber." This oil column chamber, or the tubular casing thereof, is furnished with means for heating same to maintain free fluidity of the oil or other substance therein; e. g., a steam coil may be located therein or/and the casing may be jacketed for this purpose; or I may heat same electrically;

or if desired I may provide any suitable means for cooling the separated lighter liquid in the oil column chamber.

The mixture of oil and water is delivered (preferably under constant head or pressure) as aforesaid into the main separating chamber, the oil separating out and rising through the body of liquid into the oil column chamber at the top. The latter may be freely open at its upper end and provided exteriorly with oil collecting means, e. g., an annular receptacle surrounding the upper portion of the tubular casing to receive the oil over-flowing therefrom whence same may be conducted away or removed as desired.

The aforesaid upward movement of the mixture—delivered as aforesaid into the main separating chamber—may be effected by directing the incoming stream against a dished deflecting plate or equivalent for instance a deflecting plate of rounded interior contour, e. g., hemispherical; or the mixture may be delivered direct in an upward flow into the said separating chamber, e. g., by a conduit passed upwards through the bottom; and a constant head of the mixture to be separated may be maintained by providing a tank located above the apparatus into which the mixture is delivered and from which it feeds itself by gravity into the separating chamber.

Apparatus according to my present invention is illustrated in the accompanying drawings in which:—

Fig. 4 is a vertical section, and

Figure 1:
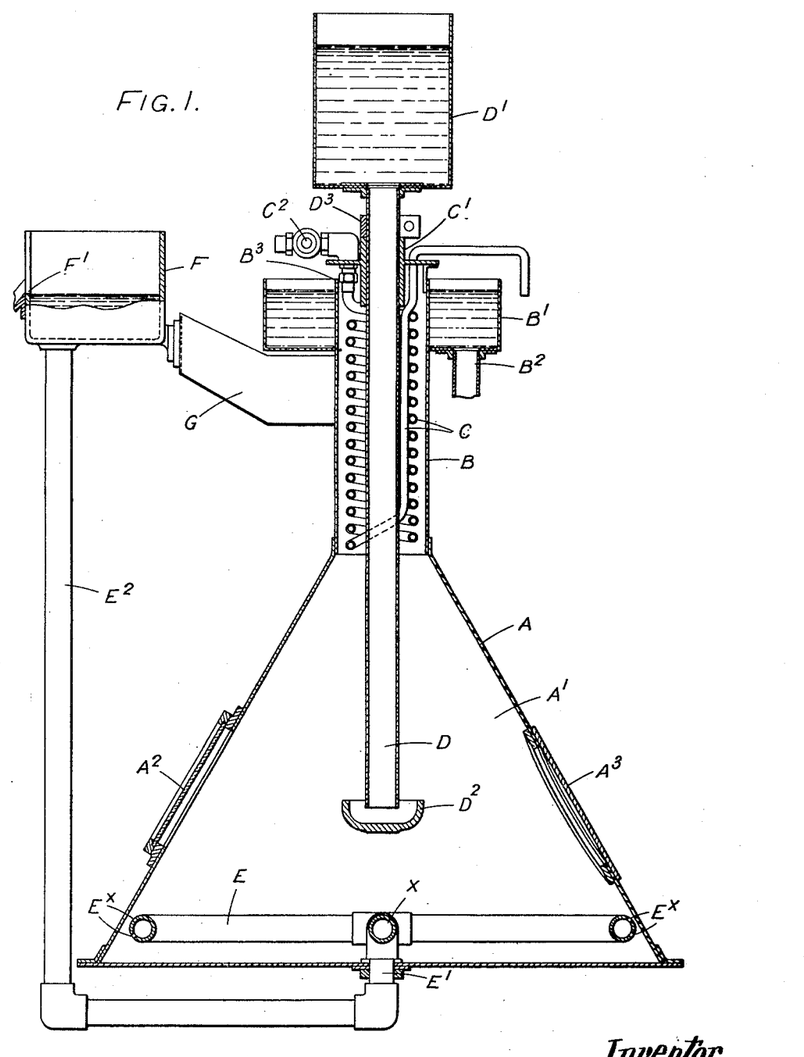
Fig. 1 is a vertical sectional view of one constructional embodiment of the invention.
Figures 2, 3:
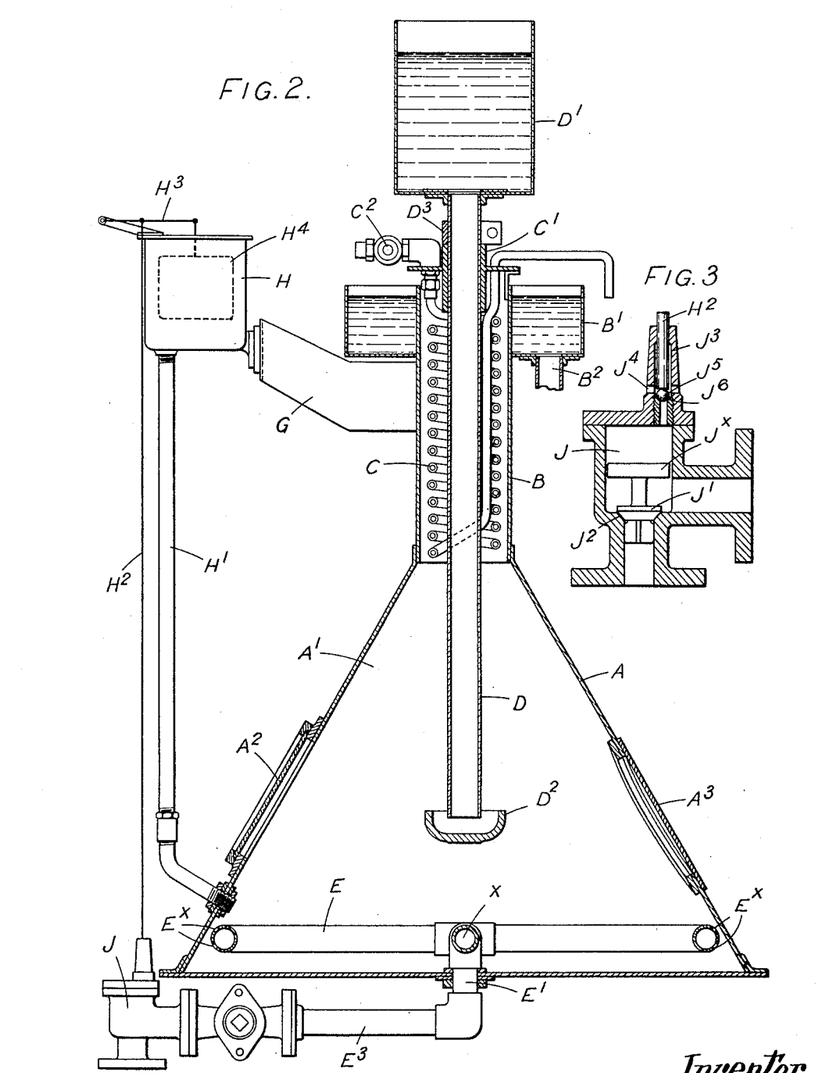
Fig. 2 is a similar view to Fig. 1 but illustrating a modified arrangement of means for controlling the delivery of the separated water.
Fig. 3 is a local vertical section on an enlarged scale of a suitable valve gear of a known type for controlling the efflux of water from the apparatus illustrated in Fig. 2.
Figure 6:
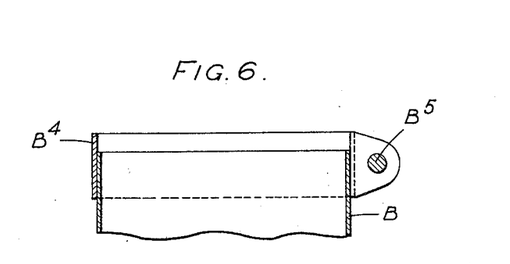
Fig. 6 is a local sectional view of a detail, viz, means for adjusting the height of the oil weir hereafter described.

Referring to Figs. 1, 2 and 6:—

A is a truncated conical casing forming the main separating chamber $A^1$ furnished with an inspection glass $A^2$ and a manhole cover $A^3$. Into or onto the upper end of tank A is fitted an upright tubular or substantially cylindrical casing B around the upper part of which is fixed an annular pan or receptacle $B^1$ having an outlet $B^2$. The open upper end $B^3$ of the casing B forms the oil weir and for the purpose of varying the height thereof an adjustable collar $B^4$ (see Fig. 6) may be provided on the casing B and arranged to be fixed in any adjusted position by a clamping screw $B^5$ (see Fig. 6).

$C^1$ is a bracket fixedly mounted on and supported on the upper end of the casing B.

A steam coil C supported by the said bracket $C^1$ is located inside the tubular casing B, a valve $C^2$ being provided to control the steam supply. An inlet pipe D for the mixture to be treated leads from a supply tank $D^1$ into the main separating chamber $A^1$ and carries on its lower end a curved or dished deflecting plate $D^2$.

This deflecting plate $D^2$ is advantageously of such form and of such dimension (diameter, etc.) and the inlet pipe D and said deflecting plate $D^2$ so located that the incoming stream of mixture is thereby directed upwardly through a central zone of said main separating chamber $A^1$.

$D^3$ is an adjustable collar provided on pipe D for the purpose of adjusting vertically the location of the delivery end of the pipe D in the main separating chamber $A^1$; the said collar $D^3$ being adapted to rest on the bracket $C^1$, which is fixed to the casing B.

A collecting pipe E in the form of a ring and provided with apertures $E^x$ is located in the lower part of the main separating chamber $A^1$ and connected to a central discharge pipe $E^1$ by a diametrically disposed cross-pipe X.

In the apparatus illustrated in Fig. 1, a pipe $E^2$ leads from the central discharge pipe $E^1$ to an elevated tank F provided with an outlet or weir $F^1$, the level of the latter being such that the column of water in the pipe $E^2$ balances the column of water and superposed column of oil in the main separating chamber A and casing B. The tank F is supported by an arm or bracket G fixed to the tubular casing B.

The apparatus illustrated in Fig. 2 is similar to that just described with reference to Fig. 1 with the exception of the means for controlling the efflux of the separated water.

In Fig. 2; H is a float chamber which is in open communication through pipe $H^1$ with the main separating chamber $A^1$; and the main outlet pipe $E^3$ is provided with a valve chamber J (see Fig. 3) having a valve $J^1$ seating at $J^2$, said valve being attached to a leaking piston $J^x$. An upward extension $J^3$ of this valve chamber J is provided with apertures $J^4$ and a ball valve $J^5$, normally held on its seating $J^6$ by a rod $H^2$ connected to a pivoted lever $H^3$ attached to a float $H^4$ in chamber H.

In operating the apparatus shown in Figs. 1, 2 and 3, the mixed oil and water is fed in any suitable manner into tank $D^1$, passes by gravity through pipe D and is directed against the deflecting plate $D^2$, the flow being directed upwardly thereby. It is to be understood that the main separating chamber A¹ and the tubular casing B are continually full of liquid during operation and it may be here noted that when starting operations with the tanks empty it is preferable to fill the tank A with water and the tubular casing B with oil, thereby establishing an oil seal the bottom of which lies advantageously about the junction of the casing A and the tubular casing B, before commencing to feed in the mixture.

The temperature or condition of fluidity of the substance in the tubular casing B can be varied or controlled by means of the coil C; and the application of a heating or a cooling medium to said coil may be automatically regulated, if desired, by any suitable thermostatic control.

In the apparatus shown in Fig. 1; the water passes into the pipe E through connection E¹, and rises through the pipe E² to the tank F¹. Further admission of mixture to the apparatus causes both the oil level in the casing B and the water level in the tank F to rise, the oil overflowing the weir B³ and the water the weir F¹. Thus a constant balance is maintained in the apparatus, the level of the water in the main separating chamber at the junction of the body of water and the column of oil remaining substantially constant approximately at the junction of the tank A and the tubular casing B, and the relative columns of effluent oil and water respectively correspond to the relative proportions of oil and water in the incoming mixture.

In the apparatus illustrated in Fig. 2, the water rises from the main separating chamber A¹ through the pipe H¹ to the float chamber H. The main water outlet through the valve chamber J is normally closed since water from the bottom of the main separating chamber A¹ passes through pipe E³ into the valve chamber J and leaks past the loose piston Jˣ, the valve J¹ being held on its seating J² by gravity as long as the weight of the float H⁴ keeps the ball valve J⁵ on its seating by means of the connecting rod H².

When mixture is fed into the main separating chamber of the apparatus the water and oil levels rise, the oil overflows the weir B³ and the float H⁴ is raised in the chamber H thereby lifting the rod H² and allowing ball valve J⁵ to be lifted by the pressure of water in chamber J. Water escapes from the upper side of the piston Jˣ through apertures J⁴ thereby allowing valve J¹ to be lifted by the pressure of water on the underside of the piston Jˣ, and water to escape through the main outlet. When the water level in float chamber H has dropped, the apertures J⁴ are again closed by the ball valve J⁵, the valve J¹ resumes its seating and the main water outlet is closed.

I make no claim whatever to the valve apparatus illustrated in Fig. 3.

Figure 4:
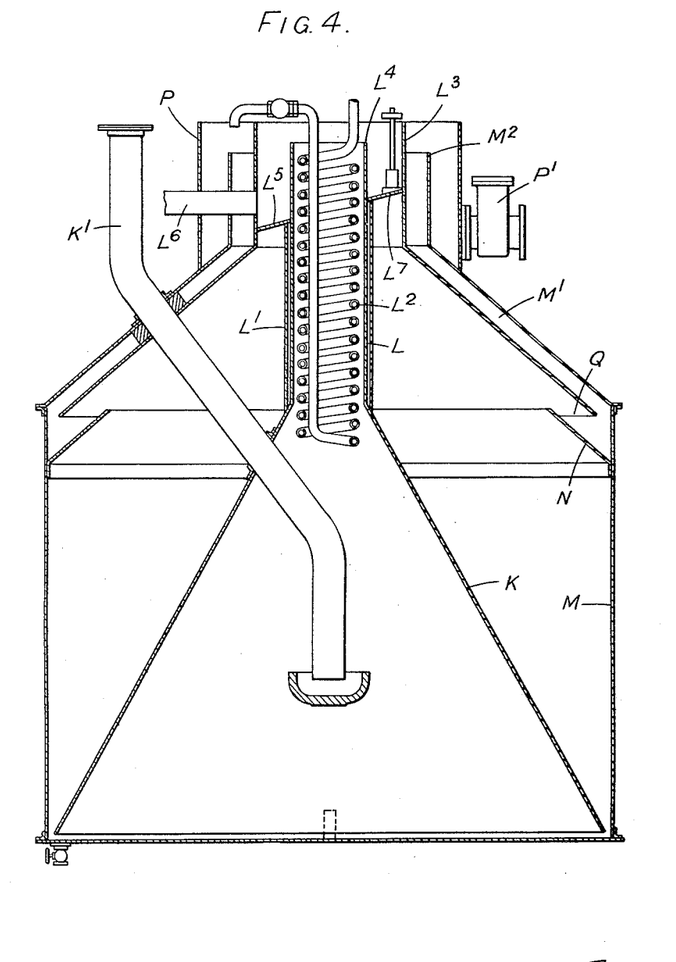
Figure 5:
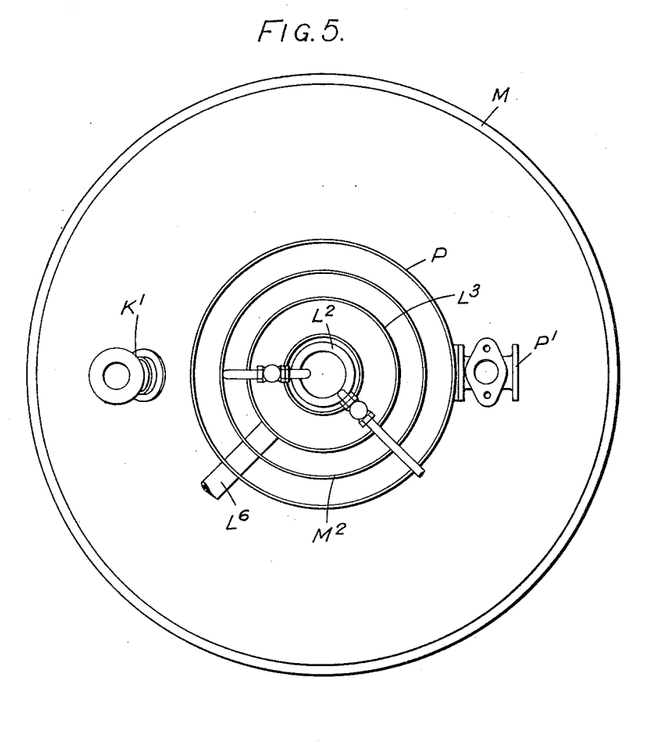
Fig. 5 is a plan view of a modified construction of apparatus according to this invention.

Figs. 4 and 5 illustrate apparatus designed to serve the double purpose of (a) maintaining the aforesaid balanced relation of the oil and water bodies in the apparatus, and (b) removing minute traces (if any) of oil remaining in the effluent water after treatment in the main separating chamber.

In this apparatus the conical casing K and the tubular casing L are located in an outer tank M, the conical casing K being open at the bottom and supported clear of the bottom of tank M. The tubular casing L is furnished with a steam jacket L¹ as well as the coil L² and the annular pan or receptacle L³ surrounding the oil weir L⁴ has a sloping bottom L⁵, the oil outlet L⁶ leading from the lower part thereof.

Conical shields or baffles N and O, the latter terminating at the top in an upright cylindrical portion O¹, provide an annular opening Q connecting with the annular passage M¹ leading to a water weir M² the level of which with respect to the oil weir L⁴ is such that the aforesaid balanced relation of the respective columns of liquid is maintained. Adjustable level regulating means such as are illustrated in Fig. 6 may be provided in conjunction with either or both of the weirs L⁴ and M² if desired.

A cylindrical casing P forms an annular chamber into which the effluent water overflows at the weir M², a valve controlled main water outlet P¹ being provided.

In operation the mixture is supplied through pipe K¹, which in this case passes into the main separating chamber exteriorly of the tubular casing L instead of passing through the oil column therein as in Figs. 1 and 2.

The oil rises through the body of water in tank K, and water passes continually into the outer tank M where the rate of flow diminishes due to the greater capacity of said tank M.

Remaining traces of oil (if any) rise to the underside of the bottom plate L⁵ whence accumulated oil may be allowed to pass into the receptacle L³ by opening valve L⁷ from time to time. Water flows out through the annular opening Q rises through passage M¹ and overflows at the weir M².

If desired I may arrange any suitable thermostatic control or regulation of the heat supplied to the oil (or lighter liquid) separated from the water or heavier liquid; for example I may employ a pyrometer in or in conjunction with the oil column so that a rise or fall in the temperature of said oil (or lighter liquid) in said column will serve to reduce or increase the supply of steam to the steam coil such as C or/and a steam jacket around said oil column.

The separated oil (or lighter liquid) can thus be run off at a constant temperature by means of such thermostatic control.

The mixture of oil and water (or other mixture) may be introduced into the main separating chamber through a pipe or conduit (or through more than one pipe or conduit) passing down through the oil column chamber into the main separating chamber or passing exteriorly of the casing of said oil column chamber (and thus avoid any cooling action thereby on the oil column) into the main separating chamber, or passing upwardly through the bottom of the main separating chamber; and delivering the mixture at the desired point or level as aforesaid in said separating chamber, the mixture in all cases being given an upward direction of flow where it is discharged into the body of liquid in the main separating chamber.

My method of, and apparatus for, separating a mixture of liquids of different specific gravity may be employed either on terra firma, or on any movable support, or in any floating vessel; my present invention being especially suitable for use on board ship where oil is carried either as the fuel for said ship or/and as cargo; so that when any mixture or water and oil occurs in such ship and it is desired to separate the water from said mixture and discharge said separated water overboard quite free (or as free as possible) of oil, this can be readily quickly and economically effected by my invention aforesaid; and at the same time the oil can be recovered and saved for use; and moreover this separation on board ship may be effected either when said ship is in harbour or in dock or when at sea and irrespective of any rolling or pitching of the vessel when the sea is other than smooth, as any such motion of the ship will not interfere appreciably (if at all) with the separating action, as in consequence of the comparatively small superficial area of the open top of the casing of the oil column the amount of oil which will by said rolling or pitching of the ship thereby be thrown or spilled over the oil weir will not be much and will not be sufficient to disturb the action of the aforesaid balanced columns or affect the separating action.

The size and relative dimensions of the main separating chamber and the tubular casing or extension on the top thereof or other structure in which the column of oil or lighter liquid is formed or collected may be proportioned according to the nature of the mixture to be separated and the rate of flow i. e. the quantity of liquid to be passed through the apparatus per given unit of time; and the height of said column of oil or lighter liquid is maintained by preserving a more or less constant level (not being a surface level) of the water or heavier liquid on which is supported and maintained said column of oil or lighter liquid; thus enabling the removal of the separated oil (or lighter liquid) free of any water (or heavier liquid).

In operation; for example for separating a mixture of oil and water:—

At the start, the apparatus may be first filled with water up to, say, the bottom of the tubular casing and the latter filled with oil to form thus the oil seal; the mixture to be separated is then discharged upwardly as aforesaid in the said body of water and the oil rises to the tubular casing and overflows at the oil weir and the separation proceeds automatically; or if desired the effluent water may be discharged by hand controlled means; but in either case the normal level of the water in the separating chamber as aforesaid is maintained and also the full column of oil is maintained in said tubular casing whether the liquid to be treated contains much or little oil.

In the case where the liquid to be treated is all or nearly all water, e. g., when it is desired to treat the liquid in a ship's oil fuel storage tank which has been only partly emptied of oil and then has had to be flooded with sea water (say half oil and half water); at the commencement of pumping from the bottom of said tank practically all water will be withdrawn therefrom and sent through my separating apparatus with the result that the oil column will remain practically static and, practically the whole input being water, the latter will flow out over the water weir—with little or no simultaneous discharge of oil at the oil weir—the water level in the separating chamber remaining constant; and then, later, the proportion of oil will increase until the input will be practically all oil which will be delivered into the water in the separating chamber of my apparatus with the result that practically the whole input now being oil the latter will flow out at the oil weir— with little or no discharge of effluent water at the water weir or water outlet.

In the term liquid I intend to include any liquefiable substance (e. g., fat) introduced into the apparatus which is either rendered liquid before introduction to the apparatus or during passage therethrough.

If desired, air may be admitted to each or any chamber together with the liquid to be treated, or air may be injected at any suitable point or points for the purpose of assisting the separation of the liquids as aforesaid.

For the purpose of cleaning the apparatus according to this invention steam or/and air may be admitted at or near the bottom or at any desired point of each or any of said chambers, and further to effect this cleaning, clear water may be introduced at the bottom or at any desired point of each or any chamber or caused to flow through the apparatus in the reverse direction.

What I claim is:—

1. The herein described method for separating liquids of different specific gravities which consists in maintaining two balanced columns of liquid consisting of an initial column in which the main separation takes place and a final column consisting almost wholly of the heavier separated liquid, maintaining the initial column at a constantly higher level than the final column and permitting both columns to discharge evenly and uniformly all round a common center, while the surfaces of the columns are exposed continually to atmospheric pressure, withdrawing the heavier liquid from the lower outer portion of the initial column evenly and uniformly all around the outer lower portion of the initial column and permitting this withdrawn liquid to enter evenly and uniformly all round the lower portion of the final column, introducing a mixture of the liquids to be separated into substantially the center of mass of the initial column, and baffling the incoming mixture to avoid short circuits between the latter and the effluent liquid at the lower outer portion of the initial column and to further divert the incoming liquid upwardly of the mass in the initial column.

2. The herein described method for separating liquids of different specific gravities which consists in introducing into a substantially conical initial column of liquid a mixture of the liquids to be separated, collecting the lighter liquid above the conical body and permitting such lighter liquid to overflow evenly all around a central point of the initial column, withdrawing the heavier liquid from the lower outer wider portion of the conical body evenly and continuously all around and discharging such withdrawn liquid into the base portion of a final column of liquid of substantially greater mass than the initial column, maintaining the level of the final column lower than the level of the lighter liquid upon the initial column and permitting the heavier liquid from the level of the final column to discharge evenly and continuously all around a central point, and baffling the mixture entering the conical body to avoid short circuits between the entering mixture and the effluent heavier liquid at the outer base portion of the conical body and further for diverting the incoming mixture upwardly of the mass in the conical body.

3. An apparatus for the separation of liquids of different specific gravities comprising a substantially conical casing adapted to surround a mixture of the liquids to be separated, means for introducing the mixture to be separated at substantially the center of mass of the liquid surrounded by the casing, a baffle for deflecting the incoming mixture upwardly of the mass in the conical casing, a cylindrical casing extending above said conical casing and being of relatively small cross section for containing the lighter liquid, a collecting vessel extending all about the upper portion of said cylindrical casing to receive the overflow of the lighter liquid evenly all about the upper edge of said cylindrical casing, and means in communication with the lower outer base portion of the conical casing for withdrawing the heavier liquid evenly at substantially all points about the base of the conical casing, said baffle so located as to prevent short circuits between the entering mixture and the effluent liquids at the outer base portion of the conical casing and at the upper circumferential discharge end of the cylindrical casing.

4. An apparatus for separating liquids of different specific gravities comprising a casing adapted to surround a body of liquid undergoing separation, an induction pipe for introducing a mixture of liquids, said induction pipe having its discharge end located above the base of the casing and at substantially the center of mass of the liquid body in the casing, a dished baffle spaced below the discharge end of said induction pipe for deflecting the incoming mixture upwardly of the liquid body, a substantially cylindrical casing of smaller diameter than said first-named casing communicating with the upper portion of said first-named casing and adapted to receive the lighter liquid, a collecting vessel extending annularly about the upper end of said cylindrical casing to receive uniformly the overflow of the lighter liquid at all points, means for withdrawing the heavier liquid evenly from all points about the lower outer base portion of said first-named casing, said dished baffle so located as to prevent short circuits between the entering mixture and the effluent liquids at the outer base portion of the first-named casing and at the upper circumferential discharge end of said cylindrical casing.

5. An apparatus for the separation of liquids of different specific gravities comprising a substantially conical casing for surrounding a body of liquid to be separated, an induction pipe entering said conical casing and having its discharge end disposed above the base of the casing and at substantially the center of mass of the liquid body, a baffle disposed below the discharge end of the pipe and being dished to deflect the incoming liquid upwardly of the mass, a substantially cylindrical casing above and communicating with the conical casing and adapted to receive the lighter fluid and providing an upper end over which the lighter fluid may overflow uniformly in all directions, a tank extending about the conical casing and in communication with the conical casing at the lower outer base portion thereof for withdrawing the heavier fluid at all points from the lower part of the liquid body, means in the tank for conveying off the lighter liquid, and means in said tank also for conveying off the heavier liquid evenly all around the circumference of the tank.

6. An apparatus for separating liquids of different specific gravities comprising a substantially conical casing for surrounding a body of liquid, an induction pipe to the conical casing having its discharge end spaced above the base of the casing and at substantially the center of mass of the liquid body, a dished baffle disposed just below the discharge end of the pipe for deflecting the incoming liquid upwardly of the mass, a substantially cylindrical casing above and communicating with the conical casing for containing the lighter liquid and adapted to permit the lighter liquid to overflow above the upper edge of said casing uniformly at all points, heating means in said cylindrical casing, a tank extending about said conical casing and communicating at its base uniformly all around with the interior of the conical casing, a baffle extending inwardly from the tank at an intermediate point adapted to deflect the liquid inwardly, another baffle spaced from the tank wall and extending below the upper edge of the last mentioned baffle, said spaced baffle forming a passage with the tank wall for the escape of the heavier liquid, and means in the tank for permitting the escape of the lighter liquid.

7. An apparatus for separating liquids of different specific gravities comprising a substantially conical casing, a cylindrical casing above the conical casing and adapted to contain the lighter separated liquid, means to introduce into the conical casing the mixture to be separated at substantially the center of mass of the conical casing, means for deflecting the incoming liquid substantially upwardly, a tank enveloping the conical casing and of greater cross sectional area than said conical casing, said tank communicating at all points with the base of said conical casing, means in the upper portion of said tank for receiving and discharging all about a central point the heavier separated liquid and for maintaining said heavier liquid at a slightly lower level than the level of the lighter separated liquid in said cylindrical casing whereby to provide two balanced columns of liquid automatically discharging both from the cylindrical casing and from said tank, the column in said conical and cylindrical casings being smaller in mass than the mass in the column in the tank.

HAROLD MONTAGUE ALEXANDER.